United States Patent
Bulatow

(10) Patent No.: US 9,768,658 B2
(45) Date of Patent: Sep. 19, 2017

(54) CASING FOR A ROTARY ELECTRIC MACHINE, AND ROTARY ELECTRIC MACHINE COMPRISING A CASING

(71) Applicant: Continental Automotive GmbH, Hannover (DE)

(72) Inventor: Michael Bulatow, Berlin (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 147 days.

(21) Appl. No.: 14/391,135

(22) PCT Filed: Apr. 9, 2013

(86) PCT No.: PCT/EP2013/057392
§ 371 (c)(1),
(2) Date: Oct. 7, 2014

(87) PCT Pub. No.: WO2013/153064
PCT Pub. Date: Oct. 17, 2013

(65) Prior Publication Data
US 2015/0069862 A1    Mar. 12, 2015

(30) Foreign Application Priority Data
Apr. 10, 2012    (DE) .................. 10 2012 205 754

(51) Int. Cl.
*H02K 5/06* (2006.01)
*H02K 5/10* (2006.01)
(Continued)

(52) U.S. Cl.
CPC ............ *H02K 5/06* (2013.01); *H02K 5/04* (2013.01); *H02K 5/10* (2013.01); *H02K 5/15* (2013.01); *H02K 5/20* (2013.01); *H02K 9/19* (2013.01)

(58) Field of Classification Search
CPC .. H02K 5/00; H02K 5/02; H02K 5/06; H02K 5/08; H02K 5/12; H02K 5/15; H02K 5/16; H02K 5/20; H02K 9/19; H02K 5/10
(Continued)

(56) References Cited

U.S. PATENT DOCUMENTS 2,322,924 A * 6/1943 Daiger .................... F25B 15/10
                                                 228/125
5,734,212 A * 3/1998 Uffelman ............. H02K 11/024
                                                 310/51

(Continued)

FOREIGN PATENT DOCUMENTS

| DE | 102009031467 A1 | 1/2011 | ............... H02K 5/15 |
| DE | 102010008584 A | 8/2011 | ............... H02K 5/08 |

(Continued)

OTHER PUBLICATIONS

International Search Report and Written Opinion, Application No. PCT/EP2013/057392, 20 pages, Jul. 10, 2014.

(Continued)

*Primary Examiner* — Bernard Rojas
*Assistant Examiner* — Alexander Singh
(74) *Attorney, Agent, or Firm* — Slayden Grubert Beard PLLC

(57) ABSTRACT

A casing for a rotary electric machine and a rotating electric machine includes an inner casing part made of a metal or a metal alloy and which encloses a stator and a rotor of the rotary electric machine, an outer casing part made of plastic and which at least partially surrounds the inner casing part, and at least one connection point located between the inner casing part and the outer casing part and which mechanically connects the outer casing part to the inner casing part, wherein the at least one connection point has a first flange on the outer casing part and a second flange on the inner casing part.

20 Claims, 3 Drawing Sheets

(51) Int. Cl.
*H02K 5/20* (2006.01)
*H02K 5/15* (2006.01)
*H02K 9/19* (2006.01)
*H02K 5/04* (2006.01)

(58) Field of Classification Search
USPC ............ 310/52, 54, 58, 60 A, 89, 90, 43, 91
See application file for complete search history.

(56) References Cited

U.S. PATENT DOCUMENTS

| | | | |
|---|---|---|---|
| 6,160,332 A * | 12/2000 | Tsuruhara | H02K 5/20 310/54 |
| 6,900,561 B2 | 5/2005 | Vlemmings et al. | 310/59 |
| 2008/0197734 A1* | 8/2008 | Huck | H02K 1/17 310/89 |
| 2008/0284263 A1 | 11/2008 | Dessirier | 310/54 |
| 2012/0267969 A1* | 10/2012 | Iwamoto | H02K 5/15 310/54 |
| 2012/0313465 A1 | 12/2012 | Prix | 310/54 |

FOREIGN PATENT DOCUMENTS

| | | | |
|---|---|---|---|
| FR | 2872643 A1 | 1/2006 | H02K 49/04 |
| WO | 03/019750 A1 | 3/2003 | H02K 5/18 |
| WO | 2013/153064 A2 | 10/2013 | H02K 5/20 |

OTHER PUBLICATIONS

Chinese Office Action, Application No. 201380019426.5, 12 pages, Mar. 10, 2016.

\* cited by examiner

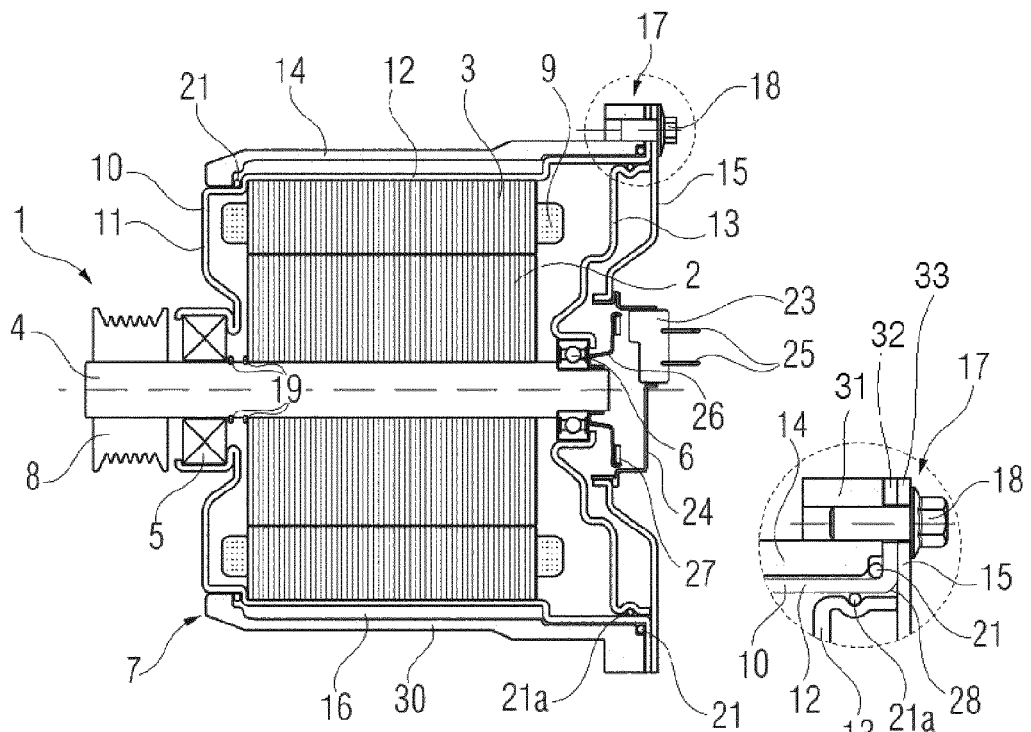
FIG 3
FIG 3a
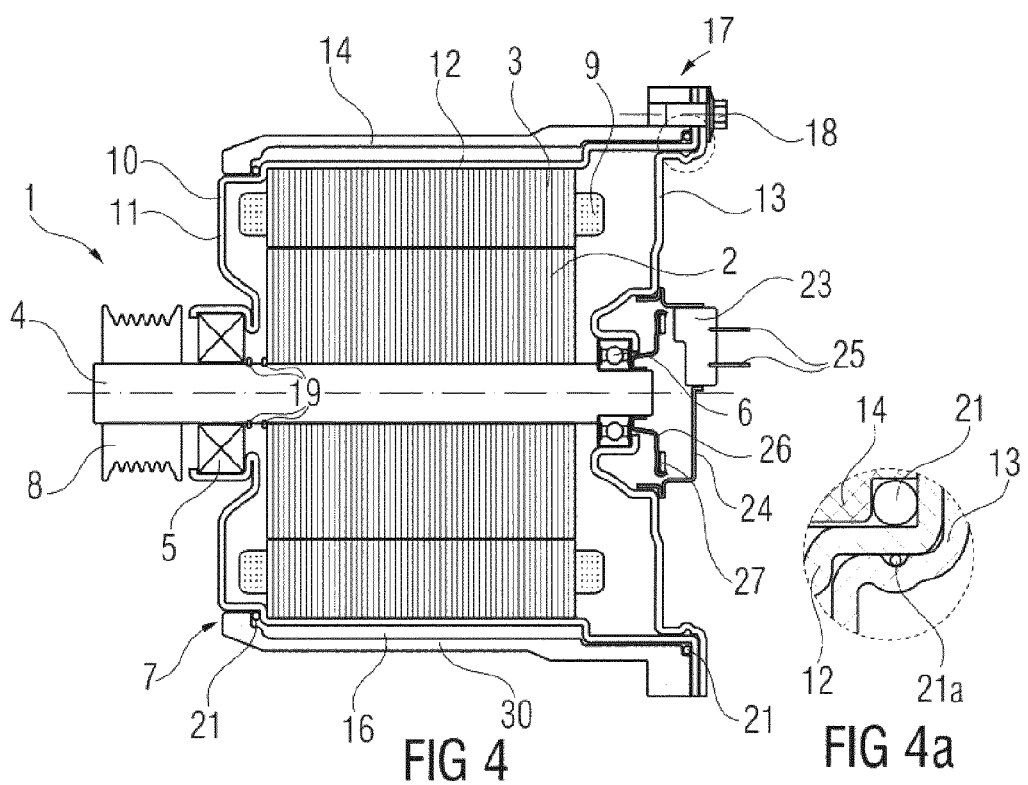
FIG 4
FIG 4a

CASING FOR A ROTARY ELECTRIC MACHINE, AND ROTARY ELECTRIC MACHINE COMPRISING A CASING

CROSS-REFERENCE TO RELATED APPLICATIONS

This application is a U.S. National Stage Application of International Application No. PCT/EP2013/057392 filed Apr. 9, 2013, which designates the United States of America, and claims priority to DE Application No. 10 2012 205 754.4 filed Apr. 10, 2012, the contents of which are hereby incorporated by reference in their entirety.

TECHNICAL FIELD

The present invention relates to a casing for a rotary electric machine, in particular for an electric motor or a generator. A method for producing a rotary electric machine comprising the above-mentioned casing is also described.

BACKGROUND

Electric motors are incorporated increasingly in modern motor vehicles. Here, they are used in particular as drive motors that are fully integrated in the drive chain or are used in hybrid applications, for example as starter generators. Here, both separately excited or permanently excited synchronous machines as well as asynchronous machines are used.

In particular, internal rotor motors up to approximately 20 kW are also used. The casings of such motors are often cooled by coolant. A casing of this type is known for example from DE 10 2009 031 467 A1.

Generally, the casing has a number of functions: it is intended to support the forces or the torque produced during operation, it can form a coolant jacket for cooling the motor, and it can provide a possibility for fastening other motor compartment assemblies. In order to perform these functions and for reasons of EMC protection, motor casings are fabricated from metal.

SUMMARY

One embodiment provides a casing for a rotary electric machine, comprising an inner casing part, which is made of a metal or a metal alloy and which encloses a stator and a rotor of the rotary electric machine; an outer casing part, which is made of a plastic and which surrounds the inner casing part at least partially; and at least one connection point, which is located between the inner casing part and the outer casing part and via which the outer casing part is mechanically connected to the inner casing part; wherein the at least one connection point comprises a first flange formed on the outer casing part and a second flange formed on the inner casing part.

In a further embodiment, the casing further comprises an end shield, wherein the end shield is mechanically connected via the at least one connection point to the inner casing part and the outer casing part, wherein the at least one connection point comprises a third flange formed on the end shield.

In a further embodiment, the first, the second and the third flange are arranged on the outer casing part in a manner overlapping one another and are interconnected in a form-fitting or force-locked manner in order to transmit force from the inner casing part and/or the end shield to the outer casing part.

In a further embodiment, the inner casing part comprises a first cylindrical wall and the outer casing part comprises a second cylindrical wall, wherein the second cylindrical wall of the outer casing part surrounds the first cylindrical wall of the inner casing part.

In a further embodiment, the casing comprises at least one cavity between the outer casing part and the inner casing part for accommodating a cooling liquid.

In a further embodiment, the cavity is formed between the first cylindrical wall of the inner casing part and the second cylindrical wall of the outer casing part.

In a further embodiment, the inner casing part consists of a metal alloy containing iron, chromium and nickel, wherein chromium is contained in a percentage by weight from 18 to 19 and nickel is contained in a percentage by weight from 12 to 13.

In a further embodiment, the end shield consists of the metal alloy containing iron, chromium and nickel, wherein chromium is contained in a percentage by weight from 18 to 19 and nickel is contained in a percentage by weight from 12 to 13.

In a further embodiment, the casing comprises at least one first O-ring between the outer casing part and the inner casing part in order to seal the cavity in a watertight manner.

In a further embodiment, the casing comprises at least one air gap in the region of the connection point and between the outer casing part, the inner casing part and/or the end shield, said air gap being configured to compensate for manufacturing tolerances between the outer casing part, the inner casing part and/or the end shield.

In a further embodiment, the casing, in the at least one air gap, comprises at least one second O-ring, which is configured to compensate for manufacturing tolerances between the outer casing part, the inner casing part and/or the end shield and to center the outer casing part, the inner casing part and/or the end shield relative to one another.

Another embodiment provides a rotary electric machine comprising a casing as disclosed above.

BRIEF DESCRIPTION OF THE DRAWINGS

Example embodiments of the invention are described in greater detail below with reference to the accompanying figures, in which:

FIG. 3 schematically shows a section through an electric motor in accordance with a second embodiment;

FIG. 3a shows a detail from FIG. 3;

FIG. 4 schematically shows a section through an electric motor in accordance with a third embodiment;

FIG. 4a shows a detail from FIG. 4;

DETAILED DESCRIPTION

Figure 1:
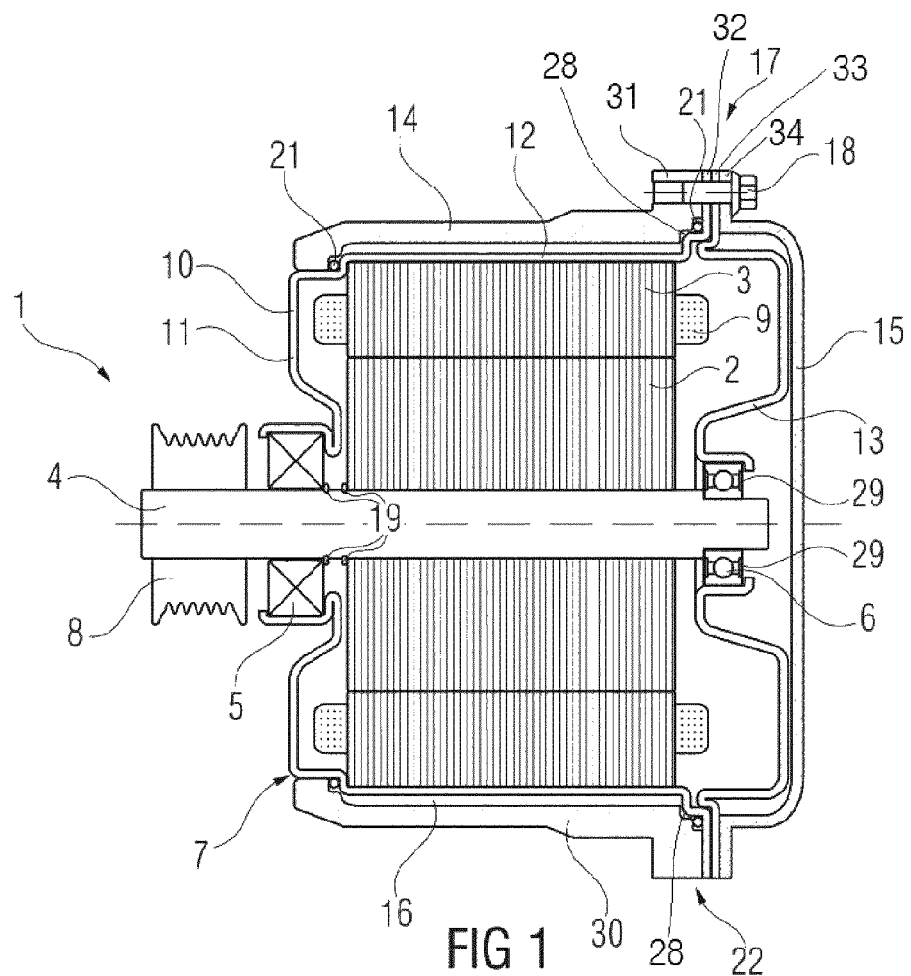
FIG. 1 schematically shows a section through an electric motor in accordance with a first embodiment.

Embodiments of the invention specify a casing for a rotary electric machine, which casing can perform the specified functions, but in addition is also particularly light. A method for producing a rotary electric machine comprising such a casing is also to be specified.

Some embodiments provide a casing for a rotary electric machine, said casing comprising an inner casing part, which encloses a stator and a rotor of the rotary electric machine, wherein the inner casing part is formed substantially from a metal or a metal alloy. The expression "formed substantially from a metal or a metal alloy" means that the inner casing part contains for the most part or predominantly a metal or a metal alloy. In other words, the base material of the inner casing part is a metal or a metal alloy. It may therefore also be possible for the inner casing part to contain a small proportion of non-metal material, for example by contamination during the production process.

The casing further comprises an outer casing part, which surrounds the inner casing part at least partially and is formed substantially from a stable plastic. The expression "formed substantially from a plastic" means that the outer casing part contains for the most part or predominantly a plastic. In other words, the base material of the outer casing part is a plastic. It may therefore also be possible for the outer casing part to contain a small proportion of metal material, for example by contamination during the production process or as metal components of the outer casing part, such as reinforcement elements, EMC foils or coolant connections.

At least one connection point is provided between the outer casing part and the inner casing part, and the outer casing part is mechanically connected to the inner casing part at said connection point. Here, the at least one connection point comprises a first flange and a second flange, wherein the first flange is formed on the outer casing part and is preferably formed integrally with the outer casing part and the second flange is formed on the inner casing part and is preferably formed integrally with the inner casing part. Forces that are transmitted from the rotor to the inner casing part are transmitted to the outer casing part via the connection point.

Here and hereinafter, the term "casing" therefore refers to the entire casing, which is divided into the inner casing part and the outer casing part.

A casing of this type has the advantage that on the one hand it is sufficiently stable to support the torque produced during operation and on the other hand it is also particularly light. The outer casing part made of plastic can perform various functions, which are usually performed by a casing formed completely of metal. The casing may provide a jacket for a cooling of the machine. The casing is of simple structure and can be produced easily. Since the casing is formed in part from plastic, the weight of the rotary electric machine reduces on the whole. In addition, the outer casing part made of plastic acts in a sound-damping manner. EMC protection is additionally ensured, since the inner casing part is formed from metal.

The formation of the connection point between the outer casing part and the inner casing part from the flanges formed on these casing parts provides the advantage that said connection point constitutes a mechanical connection which can be released without destruction and which on the one hand facilitates the positioning of the two casing parts and on the other hand effortlessly transmits the inertia force, which is created during rotation of the rotor and is transmitted from the rotor to the inner casing part, from the inner casing part to the outer casing part and then to a motor fastening, without rotation of the outer casing part and inner casing part relative to one another during this process.

Here, the flanges are preferably each formed integrally with the outer casing part and the inner casing part respectively and are formed in the manner of a plate-like connection part running around the respective casing part.

In one embodiment, the casing further comprises an end shield formed of metal or metal alloy, which end shield is mechanically connected via the at least one connection point to the outer casing part and the inner casing part. Here, the at least one connection point comprises a third flange, which is formed on the end face and is preferably formed integrally with the end shield.

In a further embodiment, the first, the second and the third flange are arranged on the outer casing part in a manner overlapping one another and are interconnected in a form-fitting or force-locked manner in order to transmit force from the inner casing part to the outer casing part.

Due to the overlapping arrangement, the flanges form what is known as a "sandwich construction". Here, the three force-transmitting flanges are brought together during the assembly with the aid of flange screws, for example. The torque is thus distributed over the flange screws and is then transmitted to the motor fastening. It is also possible to press-fit the flanges or to weld the flanges to one another.

Since the flanges of the inner casing part and of the end shield consist of stable metal or stable metal alloy, they can be used additionally as reinforcement elements in order to reinforce the connection point between the outer casing part, the inner casing part and the end shield.

In a further embodiment, the inner casing part is substantially cylindrical with a jacket and a base. The outer casing part is formed as a cylindrical jacket, which surrounds the jacket of the inner casing part. The inner casing part thus has a first cylindrical wall and a base, and the outer casing part has a second cylindrical wall, wherein the second cylindrical wall of the outer casing part surrounds the first cylindrical wall of the inner casing part.

In a further embodiment, at least one cavity for receiving a cooling liquid is formed between the outer casing part and the inner casing part. With this embodiment, the cooling jacket is formed between the outer casing part and the inner casing part. Here, the cavity is formed between the first cylindrical wall of the inner casing part and the second cylindrical wall of the outer casing part.

The axial position of the flange region can be selected in a manner dependent on the installation space. Here, the position can be selected such that the distance between the flange and fastening elements of the casing is as short as possible in order to minimize the lever effect. To this end, it would be optimal to place the flange level with the fastening elements of the casing.

In a further embodiment, the inner casing part may comprise a metal alloy, which contains iron, chromium and nickel, wherein chromium is contained in a percentage by weight from 18 to 19 and nickel is contained in a percentage by weight from 12 to 13. In particular, the metal alloy may have an alloy composition $Fe_{rest}Cr_aNi_bMn_cC_dSi_eP_fS_gN_h$, in which a, b, c, d, e, f, g and h are specified in percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

Compared with known non-rusting steels, for example steels 1.4301 and 1.4303, this material comprises a particularly high proportion of chromium and nickel. It has been found that workpieces made of this steel remain non-magnetizable, even after forming, stamping or cutting. Eddy current losses in the casing are thus reduced.

Alternatively, however, a simple, cost-effective steel, possibly with rustproof surface, can also be used. Aluminum or sintering materials can be used for the inner casing part.

The end shield may also preferably comprise a metal alloy containing iron, chromium and nickel, wherein chromium is contained in a percentage by weight from 18 to 19 and nickel is contained in a percentage by weight from 12 to 13. In particular, the metal alloy may have an alloy composition $Fe_{rest}Cr_aNi_bMn_cC_dSi_eP_fS_gN_h$, in which a, b, c, d, e, f, g and h are specified in percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

Alternatively, however, a simple, cost-effective steel, possibly with rustproof surface, aluminum, sintering materials or plastics with embedded or inserted metal foils can also be used here in order to ensure EMC protection.

In a further embodiment, the casing has at least one O-ring between the outer casing part and the inner casing part in order to seal the cavity in a watertight manner.

In a further embodiment, the outer casing part comprises additional reinforcement elements made of metal. Reinforcement elements of this type may be metal insert sleeves, by means of which the casing bores for the motor fastening or flange screws are reinforced. Connections for a water cooling system made of metal may also be formed. Furthermore, EMC foils can also be provided, which are injected into or laid in the outer casing part. EMC foils of this type can also be provided in a cover of the casing formed from plastic, for example in cases where a rotor position sensor is provided and necessitates EMC protection.

In a further embodiment, the casing comprises air gaps in the region of the connection point and between the outer casing part, the inner casing part and/or the end shield in order to compensate for the manufacturing tolerances between the outer casing part, the inner casing part and/or the end shield. At least one O-ring is preferably arranged between the outer casing part, the inner casing part and/or the end shield and compensates for the manufacturing tolerances between the outer casing part, the inner casing part and/or the end shield and also centers the outer casing part, the inner casing part and/or the end shield relative to one another.

In this embodiment, the end shield is centered with the outer casing part and the inner casing part by the O-ring, and tolerances are compensated for between the outer casing part, the inner casing part and/or the end shield by means of the flexible O-ring.

Other embodiments provide a rotary electric machine comprising the described casing. The rotary electric machine may be formed in particular as an internal rotor and may be designed for rotational speeds of 10,000 revolutions per minute and more.

Rotary electric machines of this type are suitable for use in a motor vehicle. They can be used both as drive motors fully integrated in the drive train, for example as wheel hub motors or direct-drive motors, and also for example as starter generators. In one embodiment, a motor vehicle is therefore specified which comprises the described rotary electric machine. Here, the motor vehicle can be formed as an electric vehicle or hybrid vehicle.

Other embodiments provide a method for producing a rotary electric machine comprising the described casing. In one embodiment, the stator with winding is pressed cold into the casing. Alternatively, an assembly for example by means of bonding or hot shrinking is also conceivable.

In one embodiment, the rotor together with a bearing is pressed into the inner casing part, and the bearing is rolled in without play for fastening. The fixed bearing is thus produced.

In one embodiment, the outer casing part is produced in an injection-molding process. Here, metal components of the outer casing part, such as reinforcement elements, EMC foils or coolant connections, can be inserted and molded during the injection molding. However, they may also be inserted subsequently.

Pre-fabricated plastics components of the outer casing part can also be inserted and molded during the injection-molding process. Here, 2-component or multi-component parts are produced. This is advantageous for example when a water cooling is necessary, for which purpose a second material component is integrated in the injection process. Here, the second material component may be a metal insert or a second "back-injection-molded" plastic.

FIG. 1 schematically shows a section through an electric motor 1 with a rotor 2 formed as a laminated core and with a stator 3 surrounding the rotor 2. In this embodiment, the electric motor 1 is formed as an internal rotor motor.

The rotor 2 comprises a laminated core, which is connected to a rotor shaft 4 for conjoint rotation therewith. The rotor shaft 4 is mounted by means of a fixed bearing 5 and a loose bearing 6 so as to be rotatable in a casing 7 and on an end shield 13. The fixed bearing 5 and the loose bearing 6 are formed in this embodiment as ball bearings. The loose bearing 6 comprises an adjusting plate 29, which removes the play from the loose bearing 6. At one end, the rotor shaft 4 carries a belt pulley 8 of a belt drive.

The stator 3 also comprises windings, of which merely the winding heads 9 are indicated. The stator 3 is fixedly connected to the casing 7 and surrounds the rotor 2 concentrically with the rotor shaft 4.

The casing 7 comprises a metal inner casing part 10. The inner casing part 10, in this embodiment, comprises a material formed substantially by the alloy composition $Fe_{rest}Cr_aNi_bMn_cC_dSi_eP_fS_gN_h$, in which a, b, c, d, e, f, g and h are specified in percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

The inner casing part 10 is divided into a base 11 and a jacket 12. An end shield 13, which is likewise metallic, is provided opposite the base 11.

The jacket 12 is surrounded by an outer casing part 14 made of plastic. In the embodiment shown in FIG. 1, a cover 15 made of plastic or another material is also provided and covers the end shield 13 outwardly. The end shield 13 is supported on the cover 15. A cavity 16 is formed between the inner casing part 10 and the outer casing part 14, and a coolant, for example glycol, can be passed through said cavity.

Securing rings 19 for positioning and supporting the rotor 2 may also be provided on the rotor shaft 4.

The components constituted by the outer casing part 14, inner casing part 10, end shield 13 and cover 15 are interconnected at a connection point 17 by means of flange screws 18. To this end, the connection point 17 comprises a first flange 31, a second flange 32, a third flange 33 and a fourth flange 34. Here, the first flange 31 is formed in one piece with the outer casing part 14 as an annular washer running around the outer casing part 14. The second flange 32 is formed in one piece with the inner casing part 10 as an annular washer running around the inner casing part 10. Similarly, the third flange 33 is formed in one piece with the outer casing part 14 as an annular washer running around the end shield 13. Accordingly, the fourth flange 34 is formed in one piece with the cover 15 as an annular washer running around the cover 15.

The flange screws 18 hold together the four flanges 31, 32, 33 and 34 and thus the outer casing part 14, the inner casing part 10, the end shield 13 and the cover 15. However, they also serve to transmit torque from the rotor 2 via the flanges 31, 32, 33 and 34 to the outer casing part 14 and then to the fastening elements 20 of the casing 7 illustrated in FIG. 2.

Figure 2:
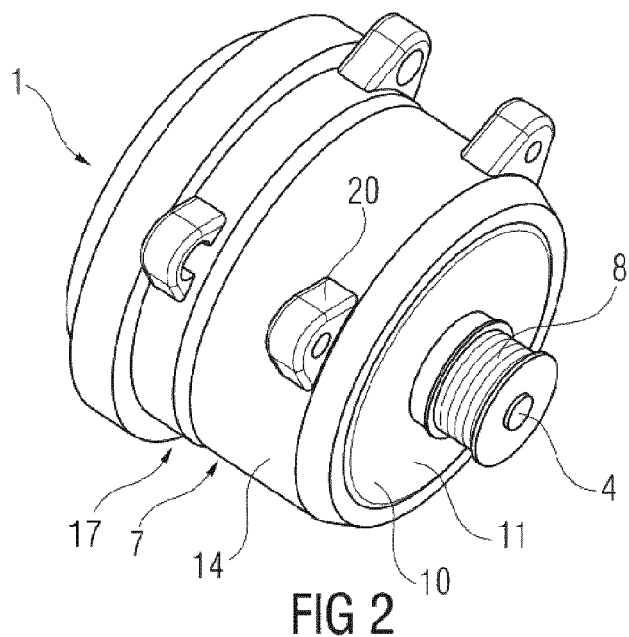
FIG. 2 schematically shows a perspective view of the electric motor according to FIG. 1.

In the embodiment shown in FIG. 1, the connection point 7 or the four flanges 31, 32, 33 and 34 is/are offset slightly in the center thereof from the end of the electric motor 1 on the loose bearing side and thus lies/lie in the vicinity of the fastening elements 20 of the casing 7 illustrated in FIG. 2.

FIG. 1 does not show a rotor position sensor. However, such a sensor may be provided in the region of the loose bearing side, as is shown for the other embodiments in FIGS. 3 to 5.

In order to seal the water-cooled electric motor 1, two O-rings 21 are provided between the outer casing part 14 and the inner casing part 10 as a particularly simple and cost-effective type of seal. The O-rings seal the cavities 16 formed between the inner casing part 10 and the outer casing part 14. Here, the outer casing part 14 is made of plastic in such a way that there is no need for any processing measures or adaptations. The two sealing regions can be produced by means of injection molding without splits. The outer casing part 14 can thus be produced easily. Tolerances are compensated for by means of the O-rings 21.

In the rear region of the casing 7, which points toward the loose bearing 6, an air gap 28 is formed between the outer casing part 14 and the inner casing part 10. This has the advantage that the outer casing part 14 and the inner casing part 10 can be produced particularly easily, because narrow tolerances do not have to be observed. A fixed connection between the outer casing part 14 and the inner casing part 10 can be implemented in the region of the O-ring 21, for example by means of a press fit or material bond in the front region, which points toward the fixed bearing 5.

FIG. 2 shows the casing 7 of the electric motor 1 in a perspective view. In this view, the fastening elements 20 are shown, at which the electric motor 1 can be fastened in the motor compartment. In the shown embodiment, the fastening elements 20 are located close to the connection point 17 in part, such that a lever is largely avoided in the event of the force transmission.

In FIG. 3, the electric motor is shown in accordance with a second embodiment. In this second embodiment, a rotor position sensor 23 is shown, which is mounted on a sensor receptacle 24. The sensor receptacle 24 is connected to the cover 15. The rotor position sensor 23 has connections to a vehicle electronics unit (not shown).

A sensor wheel 27 mounted on a receptacle 26 is arranged opposite the rotor position sensor 23 and is connected to the rotor shaft 4 for conjoint rotation therewith and rotates with the rotor shaft during operation.

In this embodiment, the cover 15 is formed from metal, in particular a sintering metal, in particular from the same material as the inner casing part 10 or the end shield 13. It therefore acts as EMC protection.

For conventional sensor types, what is known as an "encoder ring" sensor wheel formed from a plastics-bonded magnetic material is used. So that the magnetic field of the sensor wheel remains undisturbed, the receptacle is formed from a non-magnetizable material and comprises a material having substantially the alloy composition $Fe_{rest}Cr_aNi_bMn_c$-$C_dSi_eP_fS_gN_h$, in which a, b, c, d, e, f, g and h are specified in percentage by weight and $18 \leq a \leq 19$; $12 \leq b \leq 13$; $0 \leq c \leq 1.4$; $0 \leq d \leq 0.055$; $0 \leq e \leq 0.6$; $0 \leq f \leq 0.04$; $0 \leq g \leq 0.008$ and $0 \leq h \leq 0.1$.

In embodiments in which the magnetic field of the sensor wheel is not heavily influenced, magnetizable steels or other materials, such as plastics or sintering materials, can also be used.

FIG. 3a shows the connection point 17 of the electric motor 1 according to FIG. 3 in detail, comprising the first, the second and the third flange 31, 32 and 33. In this view, two O-rings 21, 21a can be seen particularly clearly. The O-ring 21 running around the inner casing part 10 is arranged between the outer casing part 14 and the inner casing part 10 and has the task of sealing the cavity 16 in a watertight manner, said cavity serving as a cooling channel for passing through a cooling liquid. The O-ring 21 running around the end shield 13 is arranged between the end shield 13 and the inner casing part 10 and has the task of compensating for manufacturing tolerances between the inner casing part 10 and the bearing shield 13 and of sealing the interior of the electric motor 1, for example against splashed water.

A small air gap 28 is provided between the end shield 13 and the inner casing part 10. As a result of this air gap 28, the end shield 13 does not contact the inner casing part 10. The end shield 13 is centered in the casing 7 with respect to the inner casing part 10 by means of the O-ring 21a. During operation, the rotor 2 does not run fully coaxially in relation to the casing 7 and in relation to the end shield 13. However, these running tolerances are compensated for by the flexible O-ring 21a. In an embodiment not shown, a further O-ring is additionally also installed in order to prevent a tipping movement of the cover 15. The O-ring 21a and the further O-ring (not illustrated) act as a damping element, in exactly the same way as the O-ring 21, and contribute to noise reduction.

FIG. 4 shows an electric motor 1 in accordance with a third embodiment. The third embodiment differs from the second shown in FIG. 3 in that the outer casing part 14 has no cover 15. In this embodiment, the rotor position sensor 23 is inserted directly from outside into the end shield 13. The receptacle 24 is connected to the end shield 13 for this purpose.

FIG. 4a shows a detail from the region of the flange 17 of the electric motor 1 according to FIG. 4. The O-rings 21, 21a can be seen particularly clearly in this view.

FIGS. 3 and 4 show axial rotor position sensors 23. However, radial sensors may also be used, for example when necessitated due to the installation space.

Figures 5, 5A:
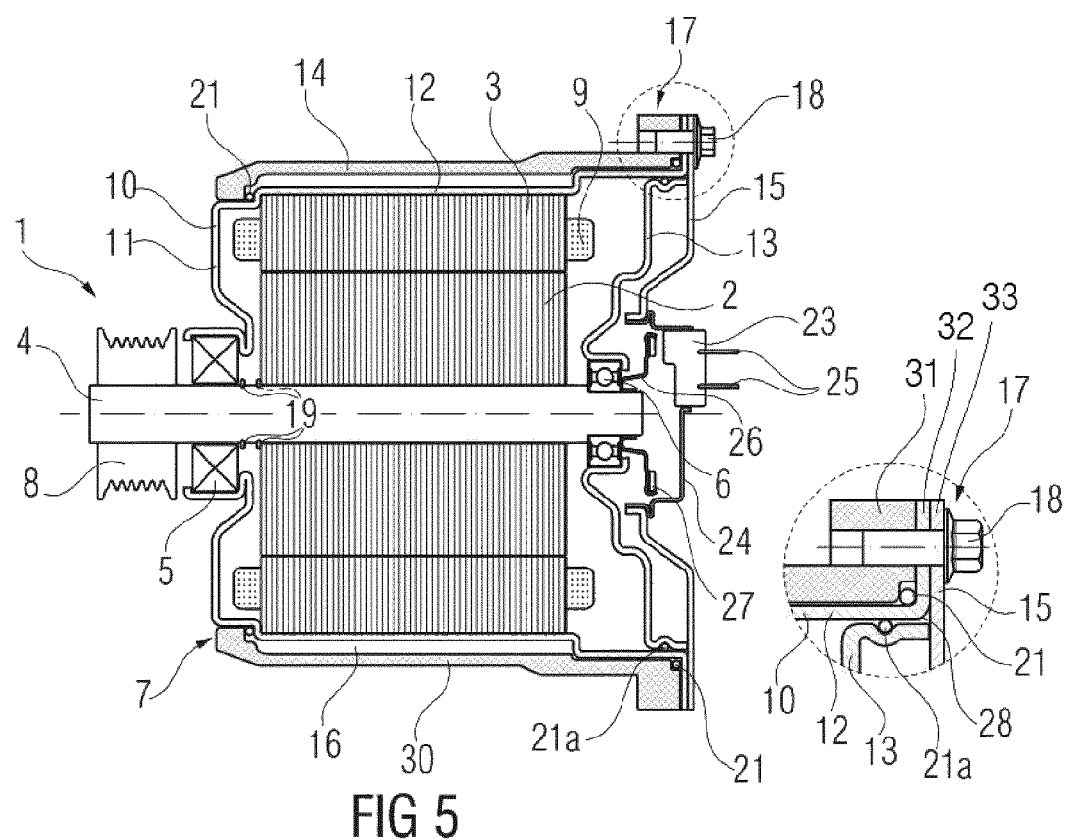
FIG. 5 schematically shows a section through an electric motor in accordance with a fourth embodiment.
FIG. 5a shows a detail from FIG. 5.

FIG. 5 schematically shows a section through an electric motor 1 in accordance with a fourth embodiment.

FIG. 5a shows a detail from the region of the flange 17 of the electric motor 1 according to FIG. 5.

Although at least one exemplary embodiment has been presented in the previous description, various amendments and modifications can be made. The specified embodiments are merely examples and are not intended to restrict the scope of validity, the scope of application or the configuration in any way. Rather, the preceding description provides a person skilled in the art with a plan for implementing at least one exemplary embodiment, wherein numerous amendments can be made concerning the function and the arrangement of elements described in an exemplary embodiment without departing from the scope of protection of the accompanying claims and the legal equivalents thereof.

In addition, a first method for producing a rotary electric machine 1 comprising an above-described casing 7, wherein the stator 3 is pressed cold into the casing 7, is disclosed.

Furthermore, a second method for producing a rotary electric machine 1 comprising an above-described casing 7 is disclosed, wherein the rotor 2 is pressed together with a bearing 5, 6 into the casing 7 and the bearing 5, 6 is rolled in without play for fastening.

In addition, a third method for producing a rotary electric machine 1 comprising an above-described casing 7 is disclosed, wherein the outer casing part 14 is produced in an injection-molding method. During the injection-molding method, metal components and/or prefabricated plastics components of the outer casing part 14 are inserted and molded with plastics casting compound.

What is claimed is:

1. A casing for a rotary electric machine, the casing comprising:
    an inner casing formed from a metal or a metal alloy, the inner casing including a base, a jacket, and an end shield combining to enclose a stator and a rotor of the rotary electric machine;
    an outer casing part and a cover both formed from a plastic, the outer casing part and cover combining to at least partially surround the inner casing;
    at least one connection point located between the inner casing jacket and the outer casing part, wherein the outer casing part is mechanically connected to the inner casing jacket via the at least one connection point;
    wherein the at least one connection point comprises a first flange formed on the outer casing part and a second flange formed on the inner casing jacket; and
    a set of flange screws passing through the first flange and the second flange to fixedly connect the inner casing jacket to the outer casing part and transmit torque from the rotor to the outer casing part.

2. The casing of claim 1, wherein the end shield is mechanically connected to the inner casing jacket and the outer casing part via the at least one connection point, wherein the at least one connection point comprises a third flange formed on the end shield.

3. The casing of claim 2, wherein the first, the second, and the third flange are arranged on the outer casing part in a manner overlapping one another and are interconnected in a form-fitting or force-locked manner in order to transmit force from at least one of the inner casing jacket and the end shield to the outer casing part.

4. The casing of claim 2, wherein the casing comprises at least one air gap in the region of the connection point and between at least one of the outer casing part, the inner casing jacket, and the end shield, said air gap being configured to compensate for manufacturing tolerances between the at least one of the outer casing part, the inner casing jacket, and the end shield.

5. The casing of claim 4, wherein the casing, in the at least one air gap, comprises at least one second O-ring, which is configured to compensate for manufacturing tolerances between the at least one of the outer casing part, the inner casing jacket, and the end shield and to center the at least one of the outer casing part, the inner casing jacket, and the end shield relative to one another.

6. The casing of claim 1, wherein the inner casing jacket comprises a first cylindrical wall and the outer casing part comprises a second cylindrical wall, wherein the second cylindrical wall of the outer casing part surrounds the first cylindrical wall of the inner casing jacket.

7. The casing of claim 1, wherein the casing comprises at least one cavity between the outer casing part and the inner casing jacket for accommodating a cooling liquid.

8. The casing of claim 7, wherein the cavity is formed between the first cylindrical wall of the inner casing jacket and the second cylindrical wall of the outer casing part.

9. The casing of claim 7, wherein the casing comprises at least one first O-ring between the outer casing part and the inner casing jacket in order to seal the cavity in a watertight manner.

10. The casing of claim 1, wherein the inner casing jacket consists of a metal alloy containing iron, chromium and nickel, wherein chromium is contained in a percentage by weight from 18 to 19 and nickel is contained in a percentage by weight from 12 to 13.

11. The casing of claim 1, further comprising a set of electromagnetic compatibility foils disposed in the outer casing part.

12. A rotary electric machine comprising:
    a casing comprising:
    an inner casing formed from a metal or a metal alloy, the inner casing including a base, a jacket, and an end shield combining to enclose a stator and a rotor of the rotary electric machine;
    an outer casing part and a cover both formed from a plastic, the outer casing part and the cover combining to at least partially surround the inner casing;
    at least one connection point located between the inner casing jacket and the outer casing part, wherein the outer casing part is mechanically connected to the inner casing jacket via the at least one connection point;
    wherein the at least one connection point comprises a first flange formed on the outer casing part and a second flange formed on the inner casing jacket; and
    a set of flange screws passing through the first flange and the second flange to fixedly connect the inner casing jacket to the outer casing part and transmit torque from the rotor to the outer casing part.

13. The rotary electric machine of claim 12, wherein the end shield is mechanically connected to the inner casing jacket and the outer casing part via the at least one connection point, wherein the at least one connection point comprises a third flange formed on the end shield.

14. The rotary electric machine of claim 13, wherein the first, the second, and the third flange are arranged on the outer casing part in a manner overlapping one another and are interconnected in a form-fitting or force-locked manner in order to transmit force from at least one of the inner casing jacket and the end shield to the outer casing part.

15. The rotary electric machine of claim 12, wherein the inner casing jacket comprises a first cylindrical wall and the outer casing part comprises a second cylindrical wall, wherein the second cylindrical wall of the outer casing part surrounds the first cylindrical wall of the inner casing part.

16. The rotary electric machine of claim 12, wherein the casing comprises at least one cavity between the outer casing part and the inner casing jacket for accommodating a cooling liquid.

17. The rotary electric machine of claim 16, wherein the cavity is formed between the first cylindrical wall of the inner casing jacket and the second cylindrical wall of the outer casing part.

18. The rotary electric machine of claim 16, wherein the casing comprises at least one first O-ring between the outer casing part and the inner casing jacket in order to seal the cavity in a watertight manner.

19. The rotary electric machine of claim 12, wherein the inner casing jacket consists of a metal alloy containing iron, chromium and nickel, wherein chromium is contained in a percentage by weight from 18 to 19 and nickel is contained in a percentage by weight from 12 to 13.

20. The rotary electric machine of claim 12, further comprising a set of electromagnetic compatibility foils disposed in the outer casing part.

* * * * *